(12) United States Patent
Johnson

(10) Patent No.: US 7,035,005 B2
(45) Date of Patent: Apr. 25, 2006

(54) ADJUSTABLE TELESCOPE TRACKING PLATFORM

(75) Inventor: Samuel Alan Johnson, Meridian, ID (US)

(73) Assignee: Johnsonian Designs, Loveland, CO (US)

( * ) Notice: Subject to any disclaimer, the term of this patent is extended or adjusted under 35 U.S.C. 154(b) by 752 days.

(21) Appl. No.: 09/874,026

(22) Filed: Jun. 6, 2001

(65) Prior Publication Data

US 2004/0218267 A1   Nov. 4, 2004

(51) Int. Cl.
*G02B 23/16*   (2006.01)

(52) U.S. Cl. .................................................... 359/430

(58) Field of Classification Search ............... 359/430, 359/362, 429, 399, 810, 822; 385/24; 74/816, 74/89.14
See application file for complete search history.

(56) References Cited

U.S. PATENT DOCUMENTS

| | | | | |
|---|---|---|---|---|
| 2,003,171 A | * | 5/1935 | Burrell | 359/364 |
| 2,326,552 A | * | 8/1943 | Morse | 359/430 |
| 3,942,865 A | * | 3/1976 | Rand | 359/430 |
| 5,062,699 A | * | 11/1991 | d'Autume | 359/430 |
| 6,639,718 B1 | * | 10/2003 | Belcher | 359/430 |

OTHER PUBLICATIONS d'Autume, Georges (author) and Sinnott, Roger W. (editor), "Gleanings for ATM's", Sky and Telescope, Sep. 1988, pp. 303-307.*
The ATM Site (Rescources and Techniques for the Amatuer . . . ) [online], Mar., 2005□□[retrieved Mar. 18, 2005]. Retrieved from the Internet: <http://www.atmsite.org/date.html>.*
Star Astronomy (Equatorial Platform Meeting Notes) [online], 1999 [retrieved Aug. 20, 2004]. Retrieved from the internet: <http://www.starastronomy.org/Library/Platform/eqplat1.html>.*
The ATM Site (Cylindrical Bearing Equatorial Platforms) [online], prior to Feb., 2000 [retrieved Aug. 18, 2004]. Retrieved from the internet: <http://www.atmsite.org/contrib/Shaw/platform/>.*

(Continued)

*Primary Examiner*—Drew A. Dunn
*Assistant Examiner*—Mark Consilvio
(74) *Attorney, Agent, or Firm*—Holland & Hart LLP

(57) ABSTRACT

An equatorial tracking platform for a telescope that comprises two rolling surfaces, each in contact with a pair of rollers which each have an adjustment for the latitude setting. One rolling surface is a complex 3-dimensional contour, which provides for a differing radius for each latitude setting, while the other rolling surface is of fixed radius. By varying the angle of the roller pairs, the virtual axis of rotation is changed to be aligned parallel to the earth's rotational axis, thus allowing a telescope to accurately track a celestial object.

21 Claims, 3 Drawing Sheets

OTHER PUBLICATIONS

Mirror Zone Calculator (Designing and calculating Couder screens for Foulcault testing) [online], Jan., 2000 [retrieved Mar. 18, 2005]. Retrieved from the internet: <http://www.atmsite.org/contrib/Carlin/couder/>.*

Cox, R.E. and Sinnott, Roger W., *An Equatorial Table for Astronomical Equipment*; Sky and Telescope (Jan. 1977. p. 64-67).

Sinnott, Roger W., *Spin-offs of the Poncet Mounting*; Sky and Telescope (Feb. 1980. p. 163-167).

Sinnott, Roger W., *Further Notes on the Poncet Platform*; Sky and Telescope (Mar. 1980. p. 251-257).

* cited by examiner

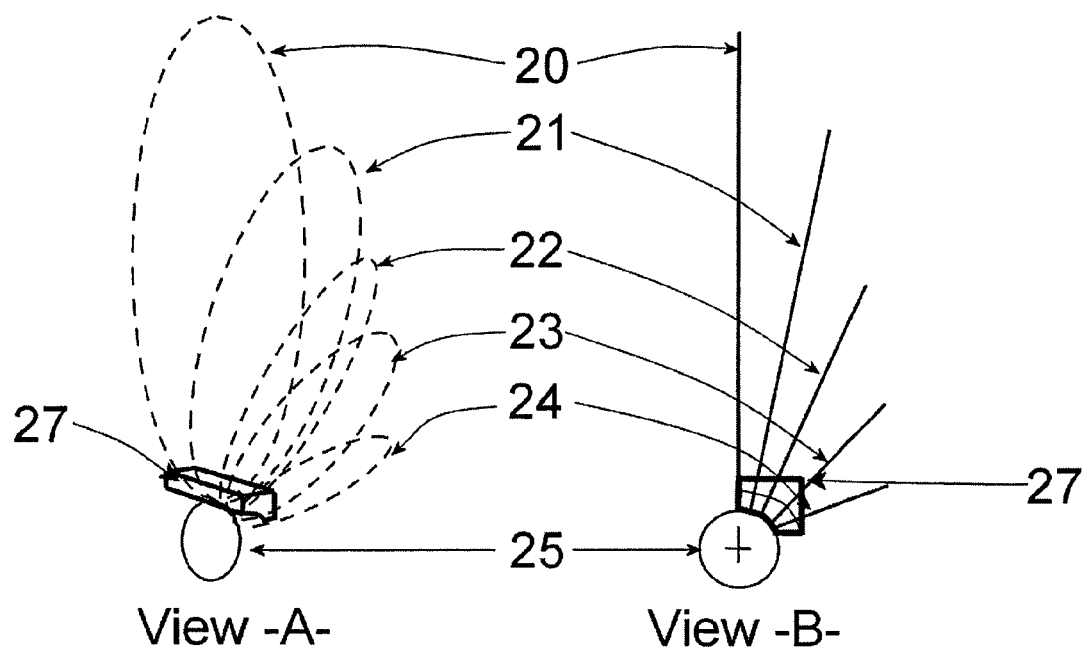
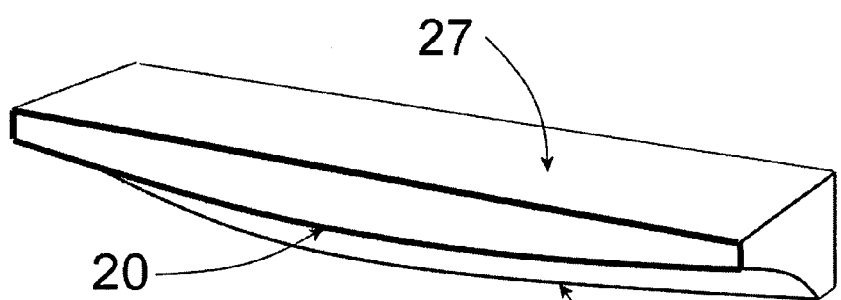

ADJUSTABLE TELESCOPE TRACKING PLATFORM

BACKGROUND OF THE INVENTION

1. Field of the Invention

The present invention relates optical and radio telescope and satellite tracking devices which must compensate for the rotational movement of the earth in order to accurately track a celestial object.

2. Description of the Relevant Art

As telescopes become larger, conventional mounting systems become large, heavy, and unwieldy. Popular today are large alt-azimuth mounted telescopes of a type referred to as Dobsionan. These are incapable of automated tracking ability, unless each axis is fitted with complex motors and drive electronics. This is inconsistent with the low cost of this type of telescope. Thus, these telescopes must be moved by hand in order to track or follow an object.

In order to allow the Dobsionan telescope to track, low profile equatorial tracking tales were developed and popularized. These consist of two horizontal table like surfaces which create a virtual axis of revolution aligned with the earth's rotational axis by the creation of two or more circular or conical bearing surfaces which are truncated by the intersecting surface of the topmost horizontal table surface. The circular or conical bearing surfaces must be accurately machined and pre-fabricated to the users latitude. Designs popularized by Gee and Poncet utilize a fixed pivot point for one bearing surface, the other being a plane or circular bearing segment. The design described by George d'Autume, U.S. Pat. No. 5,062,699, necessitates a conical surface consisting of a number of tracks and rollers. However, this too is for a singly fixed latitude, and must be pre-fabricated precisely to user's exact latitude. Thus, these platforms are unable to be mass produced and inventoried for low cost, and should the user ever move or desire to use the platform at a different latitude, another complete table must be purchased, often with long lead times.

Accordingly, these prior approaches have failed to meet the need of the telescope user.

SUMMARY OF THE PRESENT INVENTION

The present invention provides for an easily adjustable motorized equatorial tracking platform onto which can be mounted a telescope or other instrument which can compensate for the rotational movement of the earth, and allow the instrument to track a celestial object with high accuracy at any desired latitude setting.

The general design comprises two rolling surfaces, each in contact with a pair of rollers which each have an adjustment for the latitude setting. One rolling surface is a complex 3-dimensional contour, which provides for a differing radius for each latitude setting, while the other rolling surface is of fixed radius, but with adjustable latitude angle. By varying the angle of the roller pairs, the virtual axis of rotation is changed to be aligned parallel to the earth's rotational axis. When one or more of the rollers are motorized, and the virtual rotational axis of the platform is aligned with the earth's rotational axis, the invention will allow a telescope to accurately track a celestial object. By positioning the telescope on the top table surface so that the telescope center of gravity aligns with the virtual rotational axis, rotational moments are minimized and very small motors can be used to drive the telescope.

A more specific design of the equatorial platform is described at length and depicted in diagrams.

The platform consists of an adjustable front truncated bearing plate surface, of sufficient radius to ensure that the virtual polar axis which passes thru it's center of curvature is located at a higher elevation than the center of gravity of the telescope placed upon it. This front bearing surface segment is cylindrical, of fixed thickness, and rides in two grooved drive rollers spaced sufficiently apart to provide lateral support stability. One or both rollers can be motorized so as to impart a rotational translation to the front bearing plate solely by friction. The front bearing plate is attached to a somewhat horizontal top platform surface by means of an adjustable hinge assembly, which can be clamped at a user defined acute angle. The motor and drive roller assembly is carried on a motor/roller carrying plate, and is likewise adjustably hinged and clamped to a bottom horizontal base surface. This surface resides on the ground. A rear 3-dimensionally contoured bearing is spaced some defined distance from the front truncated bearing plate, and securely fastened to the underside of the top platform surface. This contoured bearing surface has machined into it a plurality of differing radii which are a function of the contact angle of a single or pair of rear support rollers, this contact angle being set by a hinged rear roller mounting bracket mounted to the bottom horizontal base surface.

For northern hemisphere installations, the front bearing surface faces north. For southern hemisphere installations, it faces south, and the drive roller rotation is reversed. In both cases, all hinge angles are adjusted to align the virtual rotational axis of the platform with the earth's rotational axis. By fine adjustments of the azimuth base position and altitude virtual axis alignment of the celestial pole, and motor speed rate, very precise tracking is possible, which will allow long exposure imaging or photography to be performed.

Other advantages and features of the present invention will become apparent from the following detailed description when read in conjunction with the accompanying drawings.

BRIEF DESCRIPTION OF THE DRAWINGS

The present invention will be more fully understood by reference to the following detailed description of the preferred embodiments of the present invention when read in conjunction with the accompanying drawings, in which like reference characters refer to like parts throughout the views, and in which:

FIG. 3 is a view of the exploded family of curves of the contoured bearing surface of the present invention.

FIG. 4 is a perspective view of the rear 3-dimensional contoured bearing surface of the present invention.

DETAILED DESCRIPTION OF THE PREFERRED EMBODIMENT OF THE PRESENT INVENTION

Figure 1:
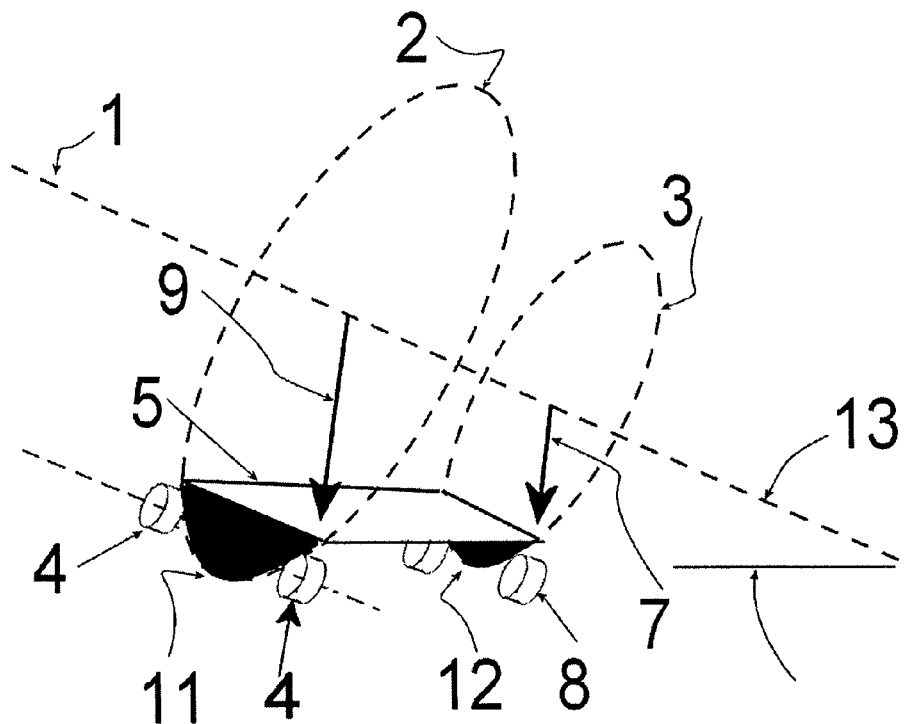
FIG. 1 is a perspective view of the principles necessary to understand the operation of an equatorial tracking platform.

The drawing describes the preferred embodiment of the present invention. While the configurations according to the illustrated embodiment are preferred, it is envisioned that alternate configurations of the present invention may be adopted without deviating from the invention as portrayed. The preferred embodiment is discussed hereafter.

Referring to FIG. 1, the principles of how an equatorial type tracking platform operates is illustrated. In order for an instrument to track celestial objects, it is necessary to rotate the instrument counter to the earth's rotational axis. Such an axis exists as a virtual axis 1, with the rate of rotation of top platform 5 being equal and opposite to the earth's rotational rate. The creation of virtual axis 1 can be seen to be created by virtual bearing surfaces 2, and 3, which have their centers of curvature aligned with virtual axis 1. Only a portion of such bearing surfaces needs physically to exist. These real surfaces are the adjustable front truncated bearing plate 11, having radius 9, and rear bearing surface 12, having radius 7. Such surfaces are planar and orthogonal to virtual axis 1. Fixed bearing rollers 4 and 8 support the real adjustable front truncated bearing plate and rear bearing surface 11 and 12, respectively, and have their rotational axis's aligned with virtual axis 1. Angle 13 defines the necessary latitudinal angle, which the virtual axis 1 must make with a horizontal surface. Thus for each latitude setting, the angles of the adjustable front truncated bearing plate 11, rear bearing surface 12, and fixed bearing rollers 4 and 8 must be adjusted to match the desired latitude setting.

Figure 2:
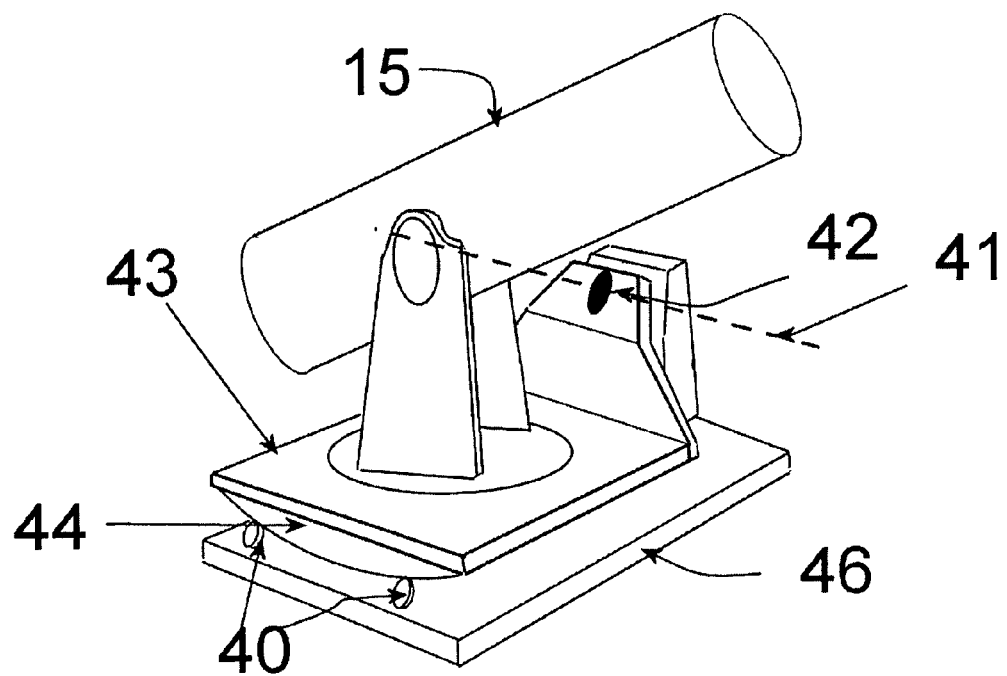
FIG. 2 is a perspective view of an equatorial platform according to the Poncet design.

Referring to FIG. 2, a Poncet type equatorial platform is illustrated. The platform includes an essentially horizontal top surface 43, a base surface 46, a rear fixed pivot 42, and a front bearing surface 44. Support rollers 40 and front bearing surface 44 are at pre-defined angles based on the latitude of operation. A virtual polar axis 41 is defined as projecting thru fixed rear pivot 42 and the center of curvature of the front bearing 44. Driving rollers 40 causes the top surface 43 to rotate about virtual polar axis 41. Onto the top surface 43 is placed a telescope 15 which will likewise be caused to rotate about virtual polar axis 41. A disadvantage of this design is the need to pre-manufacture the fixed bearing surfaces to the user latitude.

A similar platform is disclosed by d'Autume in U.S. Pat. No. 5,062,699. The top platform is attached to projected conical track elements in contact with horizontal support rollers, plus a rear track element. The virtual polar axis is inclined due to the differing radii of the front and rear track elements as with the Poncet design above. A similar disadvantage of this design is the need to pre-manufacture the fixed bearing surfaces to the user latitude.

Figure 5:
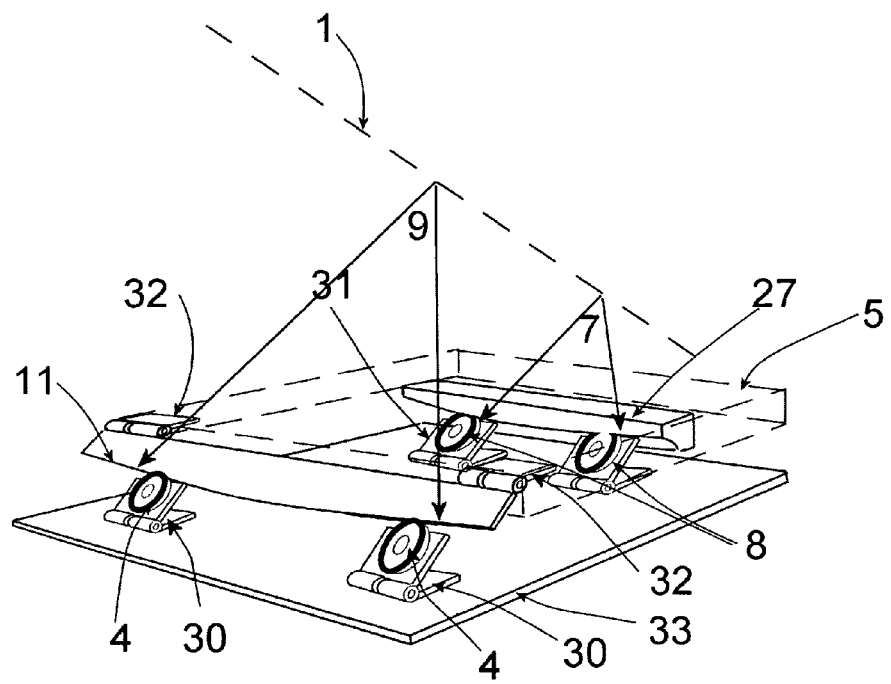
FIG. 5 is a perspective view of an equatorial platform according to the inventor's design.

FIG. 5 illustrates an important innovation of the present invention. In order to achieve different latitudinal angles of a virtual rotational axis, at least one bearing surface must have a changeable radius. View -A- of FIG. 3 indicates a family of curves or bearing contours 20–24 which can be projected onto a small fixed curvature 25. Thus, different radii are achieved as a function of contact angle with small fixed curvature 25. View -B- is a side projection, showing the greatest radius 20 when angle with respect to vertical is zero. Increasing clockwise angle corresponds 1:1 with latitude. Thus, bearing contour 20 corresponds with 0 degrees latitude, or equatorial locations. Bearing contour 23 corresponds with latitudes of 45 degrees, and so forth. A family of such contours as a function of latitudinal angle is easily described by the following equation:

$$r_j = A + B^* \sin(j) \qquad \text{Equation 1}$$

Where: A=front bearing radius, j=latitude angle, B=horizontal spacing between front and rear bearing surfaces, and $r_j$=radius of rear bearing contours. Thus, a continuous and smoothly varying surface can be fabricated as illustrated in FIG. 4. Bearing contour 20 of FIG. 3 corresponds to a vertical front face of bearing block 27 of FIG. 4. Rear bearing block 27 only needs to replicate a small portion of the curves of FIG. 3. This is apparent by referring to FIG. 1, showing only a portion of contour 3 needs expression as rear bearing surface 12. As will be seen in later figures, the expression of which contour will define the effective rear-bearing radius is a function of the angle of rear rolling bearings in contact with rear bearing block FIG. 5 is a perspective view of an equatorial platform according to the present inventor's initial invention. Adjustable front truncated bearing plate surface 11 has sufficient radius to ensure that the virtual polar axis which passes thru its center of curvature is located at a higher elevation than the center of gravity of the telescope placed upon it. This adjustable front truncated bearing plate 11 is cylindrical, of fixed thickness, and rides in two grooved drive rollers 4 spaced sufficiently apart to provide lateral support stability. One or both rollers 4 can be motorized so as to impart a rotational translation to the front bearing plate solely by friction. The front bearing plate is attached to a somewhat horizontal top platform surface 5 by means of adjustable hinge assemblies 32 which can be clamped by known methods at a user defined acute angle. The drive rollers 4 are carried on adjustable hinge assemblies 30, and is likewise adjustably hinged and clamped to a bottom horizontal base surface 33. This bottom horizontal base surface 33 resides on the ground. A rear 3-dimensionally contoured bearing 27 is spaced some defined distance B from the adjustable front truncated bearing plate 11. The variable B represents this distance from equation 1. Rear contoured bearing 27 is securely fastened to the underside of the top platform surface 5. This contoured bearing surface has machined into it a plurality of differing radii which are a function of the contact angle of a single or pair of rear support rollers, this contact angle being set by a hinged rear roller mounting bracket 14 mounted to the bottom horizontal base surface 5. For northern hemisphere installations, the adjustable front truncated bearing plate 11 faces north. For southern hemisphere installations, it faces south, and the drive roller rotation 4 is reversed. In both cases, all hinge angles associated with the adjustable hinge assemblies 30, 32, and 14 are adjusted to align the virtual rotational axis of the platform with the earth's rotational axis.

Figure 6A:
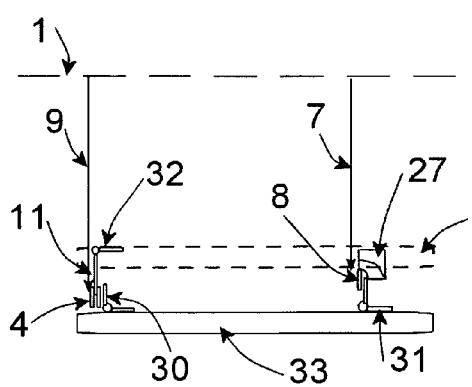
FIGS. 6A and 6B are diagrammatic side views of the virtual polar axis angles as a function of the latitude hinge clamping angles.

FIG. 6A shows a side view projection for a latitude of near zero degrees, showing rear fixed bearing roller 8 in a vertical orientation and contacting nearly surface contour 20 of rear bearing block 27. Thus, as predicted by equation I, radius 7 equals radius 9, thus the virtual rotational axis 1 must be nearly zero degrees, or horizontal.

Figure 6B:
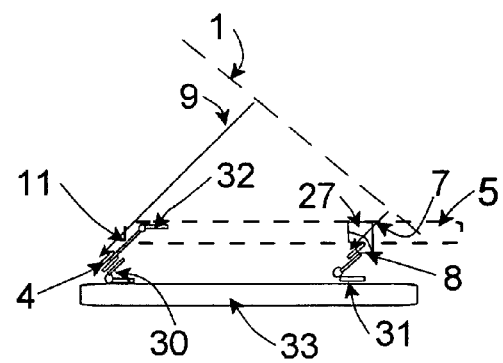

FIG. 6B shows a side view projection for latitude of nearly 45 degrees. Thus, the adjustable hinge assemblies 30 and 31 are adjusted from the vertical zero degree position by the angle displacement equal to the latitude of operation, while front the adjustable hinge assembly 32 is clamped at an acute angle equal to 90 degrees plus the latitude angle of operation. Thus, rear fixed bearing roller 8 contacts a smaller radius of engagement machined into rear bearing block 27.

This adjustment has the net effect of creating an effective radius 7, which causes the virtual rotational axis 1 to match the latitude angle. Also it can be seen that radii 9 and 7 meet the precondition that they are orthogonal to the virtual rotational axis 1 .a bearing block similar to the rear bearing block 27, thus eliminating one angle adjustment by the user. By machining into its contour a fixed and constant radius as a function of latitude contact angle, operation will be identical to that described for FIG. 5. By machining into its contour a variable radius as a function of latitude contact angle, significantly more degrees of freedom would allow for precise positioning of the virtual rotational axis to coincide with the center of gravity of any telescope placed upon it, thus improving the rotational balance of the system and reducing the power required to drive it.

It can also be seen by inspection of FIGS. 5 and 6, which the adjustable front truncated bearing plate 11 could be easily replaced by Thus there has been described an invention which allows for adjustment of elements to allow operation of an equatorial tracking platform at any latitude angle. Having described my invention, many modifications will become apparent to those skilled in the art to which it pertains without deviation from the spirit of the invention as defined by the scope of the appended claims.

I claim:

1. An equatorial tracking platform for a telescope, operable at a plurality of latitudes, said platform comprising:
   an essentially planar telescope platform, said platform having a top and bottom side, a platform base being situated below said platform top;
   said platform base having a plurality of adjustable engagement angle rolling bearing elements;
   said essentially planar telescope platform having attached to the bottom side a contoured rear bearing block having fabricated into its surfaces a plurality of contours of differing radii in contact with at least two of the rollers, at least two of the plurality of contours comprising non-common axes and the plurality of contours are continuous and non-rotationally-symmetric;
   said essentially planar telescope platform also having a front bearing surface of fixed radius and adjustable angle;
   said front bearing surface and rear bearing block contacting said rolling bearing elements.

2. An equatorial tracking platform for a telescope of claim 1, further comprising motors fitted to one or more of its rolling bearing elements.

3. An equatorial tracking platform for a telescope, operable at a plurality of latitudes, said platform comprising:
   an essentially planar telescope platform, said platform having a top and bottom side, a platform base being situated below said platform top;
   said platform base having a plurality of adjustable engagement angle rolling bearing elements;
   said essentially planar telescope platform having attached to the bottom side a contoured rear bearing block having fabricated into its surfaces a plurality of contours of differing radii in contact with at least two of the rollers, at least two of the plurality of contours comprising non-common axes and the plurality of contours are continuous and non-rotationally-symmetric;
   said essentially planar telescope platform also having a front bearing surface having fabricated into its surfaces varying radii segments,
   said front bearing surface and rear bearing block contacting said rolling bearing elements.

4. An equatorial tracking platform for a telescope of claim 3, further comprising motors fitted to one or more of its rolling bearing elements.

5. An equatorial tracking platform for a telescope, operable at a plurality of latitudes, said platform comprising:
   an essentially planar telescope platform, said platform having a top and bottom side, a platform base being situated below said platform top;
   said platform base having a plurality of adjustable engagement angle rolling bearing elements;
   said essentially planar telescope platform having attached to the bottom side a contoured rear bearing block having fabricated into its surfaces a plurality of contours of differing radii in contact with at least two of the rollers, at least two of the plurality of contours comprising non-common axes and the plurality of contours are continuous and non-rotationally-symmetric;
   said essentially planar telescope platform also having a front bearing surface having fabricated into its surfaces a fixed radii segment;
   said front bearing surface and rear bearing block contacting said rolling bearing elements.

6. An equatorial tracking platform for a telescope of claim 5, further comprising motors fitted to one or more of the rolling bearing elements.

7. A tracking platform for a telescope, comprising:
   a planar base;
   a plurality of adjustable hinges attached to the planar base;
   a roller mounted to each of the plurality of adjustable hinges;
   a telescope platform supported by the rollers;
   wherein the telescope platform comprises a rear bearing block comprising a plurality of contours of differing radii in contact with at least two of the rollers, at least two of the plurality of contours comprising non-common axes and the plurality of contours are continuous and non-rotationally-symmetric.

8. A tracking platform for a telescope according to claim 7, wherein the contours of differing radii are defined as a function of contact angle between the rear bearing block and the at least two rollers.

9. A tracking platform for a telescope according to claim 7, further comprising:
   at least one additional adjustable hinge attached to the telescope platform;
   a front bearing surface attached to the at least one adjustable hinge in contact with at least two more of the rollers.

10. A tracking platform for a telescope according to claim 9 wherein the plurality of adjustable hinges comprise a front pair of hinges and a rear pair of hinges, wherein each of the pair of front and rear hinges is adjusted from vertical by an angle of displacement equal to a latitude angle of operation.

11. A tracking platform for a telescope according to claim 10 wherein the at least one additional adjustable hinge is adjusted to an angle of displacement equal to 90 degrees plus the latitude angle of operation.

12. A tracking platform for a telescope according to claim 9 wherein the front bearing surface comprises a plurality of radii as a function of latitude contact angle.

13. A tracking platform for a telescope according to claim 7 wherein the at least one additional adjustable hinge is attached to a top surface of the telescope platform.

14. A tracking platform for a telescope according to claim 7 wherein the plurality of contours of differing radii comprise a family of contours defined as a function of latitudinal angle according to the following equation:

$$r_j = A + B \cdot \sin(j);$$

wherein A is a front bearing surface radius of the telescope platform, j is the latitude angle, and B is a spacing between the front bearing surface and the rear bearing block.

15. A method of operating a telescope tracking platform, comprising:

providing a planar base, a plurality of adjustable hinges attached to the planar base, a roller mounted to each of the plurality of adjustable hinges, a telescope platform supported by the rollers, the telescope platform comprising a rear bearing block comprising a plurality of contours of differing radii in contact with at least two of the rollers, at least two of the plurality of contours comprising non-common axes and the plurality of contours are continuous and non-rotationally-symmetric;

adjusting each of the plurality of adjustable hinges to an angle of displacement from vertical equal to a latitude angle of operation.

16. A method of operating a telescope tracking platform according to claim 15, further comprising:

providing at least one additional adjustable hinge attached to the telescope platform and a front bearing surface attached to the at least one adjustable hinge in contact with at least two more of the rollers;

adjusting the at least one additional hinge to an angle of displacement equal to 90 degrees plus the latitude angle of operation.

17. A tracking platform for a telescope, comprising:

a planar base;

a plurality of rollers attached to the planar base;

a telescope platform supported by the plurality of rollers;

wherein the telescope platform comprises a rear bearing block comprising a plurality of continuous contours of differing radii in contact with at least two of the rollers, at least two of the plurality of contours comprising non-common axes and the plurality of contours are continuous and non-rotationally-symmetric.

18. A tracking platform for a telescope according to claim 17, wherein the telescope platform comprises a front bearing block comprising a plurality of continuous contours of differing radii in contact with at least two of the rollers.

19. A tracking platform for a telescope, comprising:

a base;

a plurality of rollers attached to the base;

a telescope platform supported by the plurality of rollers;

wherein the telescope platform comprises a bearing block comprising a plurality of contours of differing radii in contact with at least two of the rollers, at least two of the plurality of contours comprising non-common axes and the plurality of contours are continuous and non-rotationally-symmetric.

20. A method of operating a telescope tracking platform, comprising:

providing a planar base, a plurality of adjustable hinges attached to the planar base, a roller mounted to each of the plurality of adjustable hinges, a telescope platform supported by the rollers, the telescope platform comprising a rear bearing block comprising a plurality of contours of differing radii in contact with at least two of the rollers, at least two of the plurality of contours comprising non-common axes and the plurality of contours are continuous and non-rotationally-symmetric;

adjusting the differing radii as a function of contact angle with the rollers to correspond with a latitude angle of operation.

21. A method of operating a telescope tracking platform according to claim 20, further comprising:

providing at least one additional adjustable hinge attached to the telescope platform and a front bearing surface attached to the at least one adjustable hinge in contact with at least two more of the rollers;

adjusting the at least one additional hinge to an angle of displacement equal to 90 degrees plus the latitude angle of operation.

* * * * *